US009830158B2

(12) United States Patent
Choquette et al.

(10) Patent No.: US 9,830,158 B2
(45) Date of Patent: Nov. 28, 2017

(54) SPECULATIVE EXECUTION AND ROLLBACK

(75) Inventors: Jack Hilaire Choquette, Palo Alto, CA (US); Olivier Giroux, San Jose, CA (US); Robert J. Stoll, Los Altos, CA (US); Xiaogang Qiu, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 607 days.

(21) Appl. No.: 13/289,643

(22) Filed: Nov. 4, 2011

(65) Prior Publication Data

US 2013/0117541 A1 May 9, 2013

(51) Int. Cl.
G06F 9/38 (2006.01)

(52) U.S. Cl.
CPC .......... *G06F 9/3842* (2013.01); *G06F 9/3851* (2013.01); *G06F 9/3861* (2013.01)

(58) Field of Classification Search
CPC .............................. G06F 9/3842; G06F 9/3851
See application file for complete search history.

(56) References Cited

U.S. PATENT DOCUMENTS

| 6,233,690 B1* | 5/2001 | Choi ..................... G06F 9/3824 712/E9.046 |
| 2006/0149935 A1* | 7/2006 | Eickemeyer et al. ........ 712/219 |
| 2006/0179284 A1* | 8/2006 | Jensen et al. ................. 712/219 |
| 2007/0143755 A1* | 6/2007 | Sahu et al. .................... 718/100 |
| 2009/0217020 A1* | 8/2009 | Yourst ........................... 712/245 |
| 2009/0249349 A1* | 10/2009 | Bose ..................... G06F 9/4893 718/103 |
| 2011/0078427 A1* | 3/2011 | Shebanow et al. ........... 712/244 |
| 2011/0209154 A1* | 8/2011 | Gooding et al. .............. 718/103 |

FOREIGN PATENT DOCUMENTS

CN 101128797 A 2/2008

OTHER PUBLICATIONS

Arvind, "Branch Prediction and Speculative Execution", Computer Science and Artifical Intelligence Laboratory, M.I.T., Oct. 26, 2005, 10 pages. https://ocw.mit.edu/courses/electrical-engineering-and-computer-science/6-823-computer-system-architecture-fall-2005/.

* cited by examiner

*Primary Examiner* — John Lindlof
(74) *Attorney, Agent, or Firm* — Artegis Law Group, LLP

(57) ABSTRACT

One embodiment of the present invention sets forth a technique for speculatively issuing instructions to allow a processing pipeline to continue to process some instructions during rollback of other instructions. A scheduler circuit issues instructions for execution assuming that, several cycles later, when the instructions reach multithreaded execution units, that dependencies between the instructions will be resolved, resources will be available, operand data will be available, and other conditions will not prevent execution of the instructions. When a rollback condition exists at the point of execution for an instruction for a particular thread group, the instruction is not dispatched to the multithreaded execution units. However, other instructions issued by the scheduler circuit for execution by different thread groups, and for which a rollback condition does not exist, are executed by the multithreaded execution units. The instruction incurring the rollback condition is reissued after the rollback condition no longer exists.

28 Claims, 7 Drawing Sheets

SPECULATIVE EXECUTION AND ROLLBACK

BACKGROUND OF THE INVENTION

Field of the Invention

The present invention generally relates to execution of compute tasks and more specifically to speculative execution of instructions and rollback.

Description of the Related Art

Conventional pipelined processors have performed speculative execution of conditional branch instructions by predicting which side of the conditional branch will be executed. When the prediction is incorrect, the instructions are rolled back so that the other side of the conditional branch may be executed. When the instructions are rolled back, pipeline stages of the processing pipeline are idle until the instructions for the other side of the conditional branch reach those pipeline stages.

Accordingly, what is needed in the art is a system and method for speculatively issuing instructions that allows the processing pipeline to continue to process some instructions during rollback of other instructions. Importantly, the speculative execution should not be limited to conditional branch instructions.

SUMMARY OF THE INVENTION

A system and method for speculatively issuing instructions allows a processing pipeline to continue to process some instructions during rollback of other instructions. A scheduler circuit issues instructions for execution by multi-threaded execution units assuming that, several cycles later, when the instructions reach the multithreaded execution units, that dependencies between the instructions will be resolved, resources will be available, operand data will be available, and other conditions will not prevent execution of the instructions. When a rollback condition exists at the point of execution for an instruction for a particular thread group, the instruction is not dispatched to the multithreaded execution units. However, other instructions issued by the scheduler circuit for execution by different thread groups, and for which a rollback condition does not exist, are executed by the multithreaded execution units. The instruction incurring the rollback condition is reissued after the rollback condition no longer exists.

Various embodiments of a method of the invention for performing rollback of speculatively issued instructions include issuing a first set of instructions for a first thread group and issuing a second set of instructions for a second thread group. A rollback condition is detected for at least one thread in the first thread group during pre-execution processing of an instruction in the first set of instructions and issuing of additional instructions for the first thread group is stopped. In-flight instructions that have issued and have not been executed in the first set of instructions are discarded and the second set of instructions for the second thread group are executed.

Various embodiments of the invention include a system for performing rollback of speculatively issued instructions. The system includes a memory, a scheduler unit, a dispatch unit, and multiple execution units. The memory is configured to store a first set of instructions for a first thread group and a second set of instructions for a second thread group. The scheduler unit that is configured to issue the first set of instructions for the first thread group, issue the second set of instructions for the second thread group, and stop issuing additional instructions for the first thread group when a rollback condition is detected. The dispatch unit is configured to detect the rollback condition for at least one thread in the first thread group during pre-execution processing of an instruction in the first set of instructions and discard in-flight instructions that have issued and have not been executed in the first set of instructions. The multiple execution units are configured to execute the second set of instructions for the second thread group.

Importantly, the speculative issuing of instructions is not limited to conditional branch instructions. The scheduler circuit does not decode the instructions, and, therefore, does not perform predictive operations. As late as at the point of execution, if any instruction for a particular thread group incurs a rollback condition, the instruction is not executed and rollback is performed for the instruction and other instructions already issued for the particular thread group.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
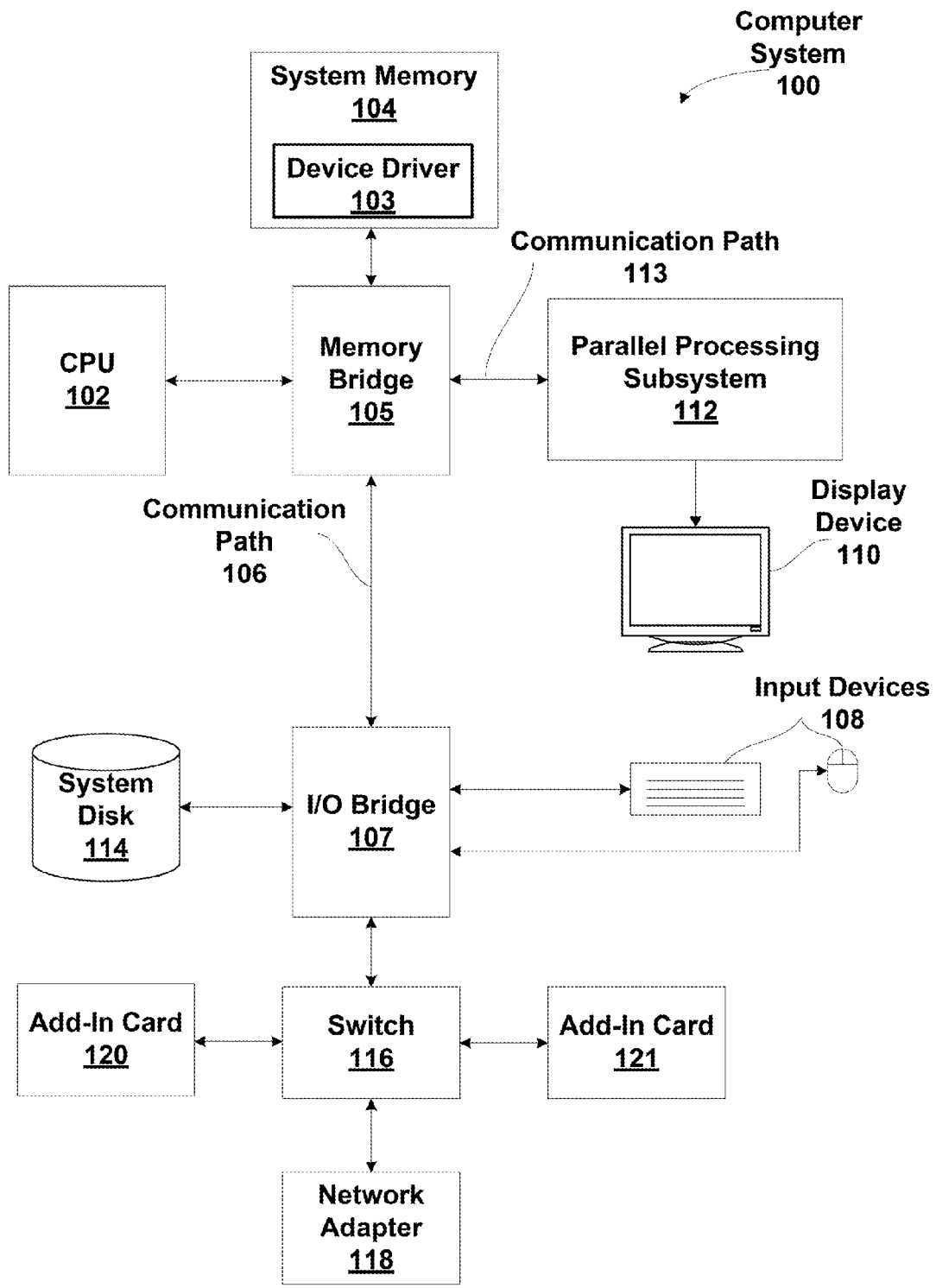
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
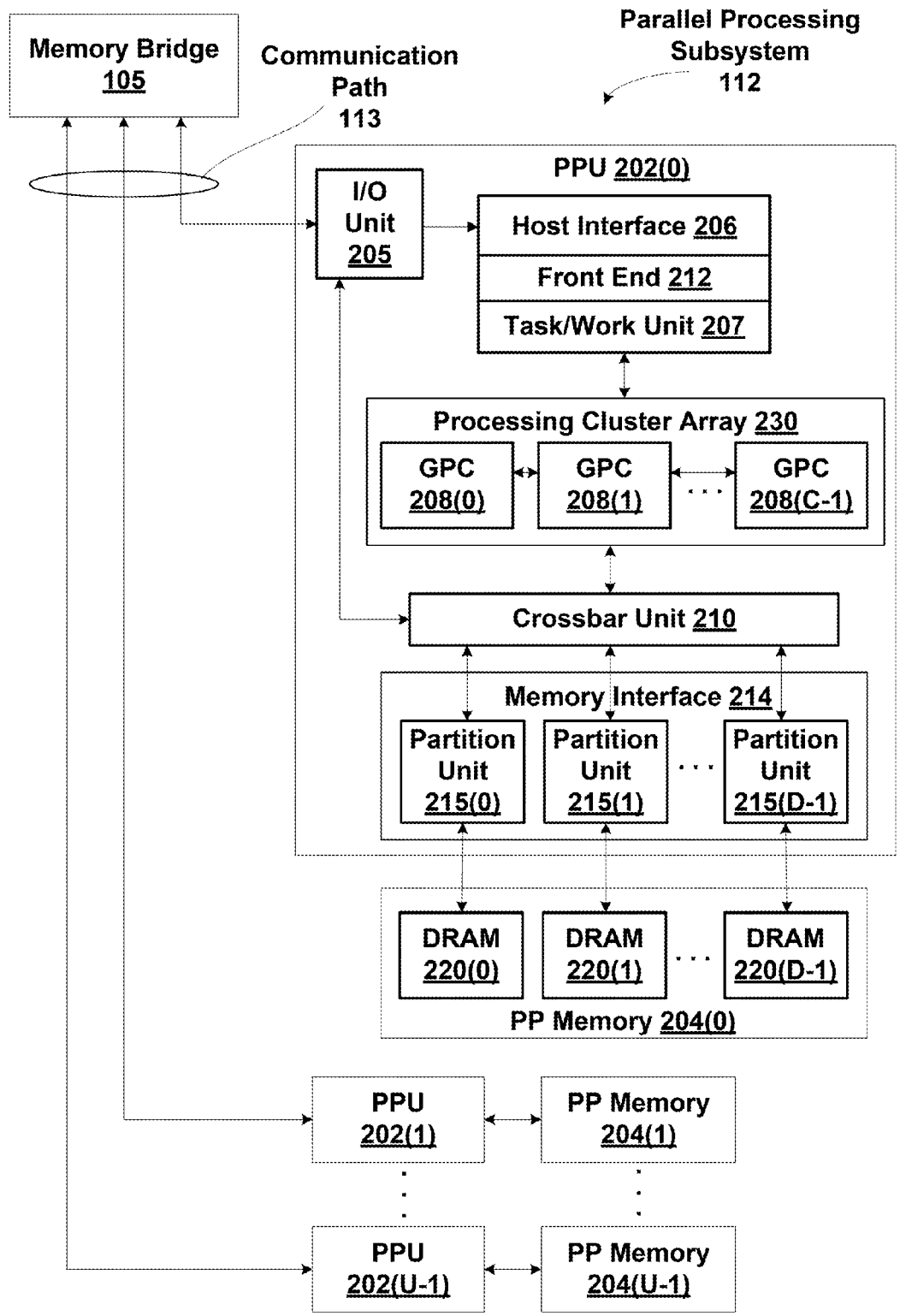
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks that are encoded as queue metadata (QMD) and stored in memory. The pointers to QMDs are included in the command stream that is stored as a pushbuffer and received by the front end unit 212 from the host interface 206. Processing tasks that may be encoded as QMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the QMDs is initiated. A priority may be specified for each QMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
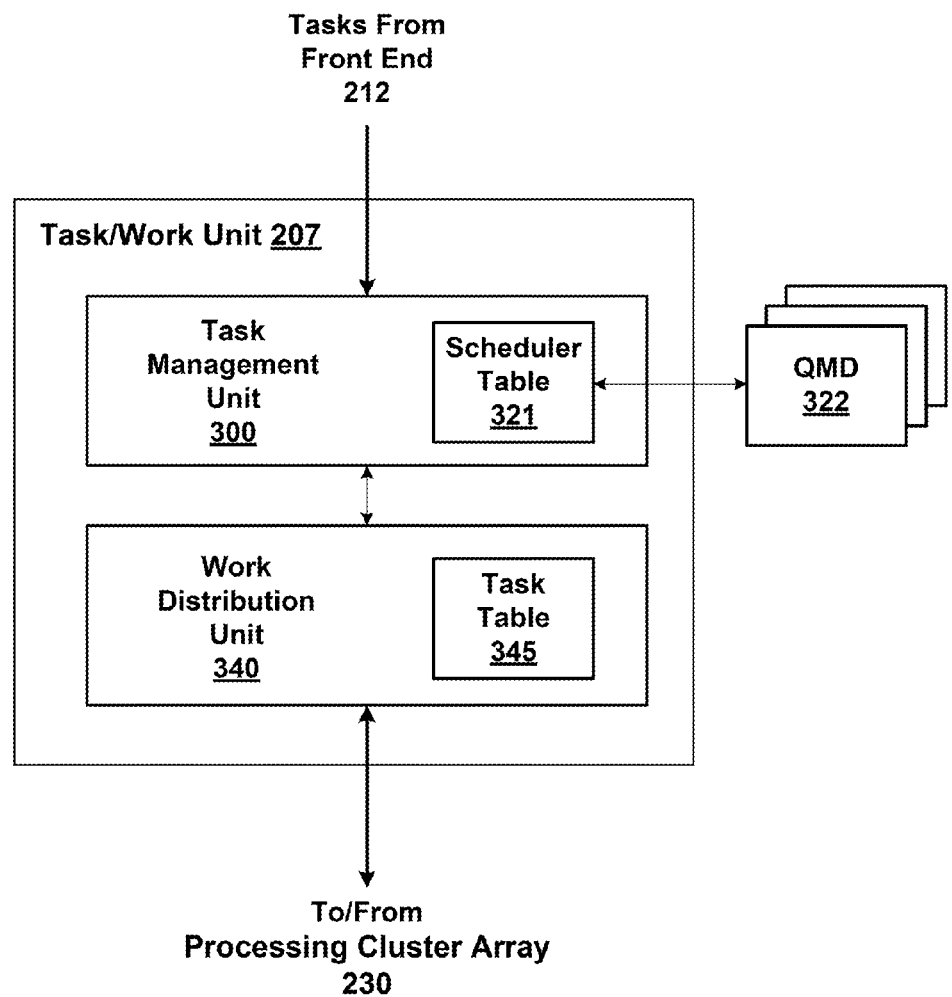
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the QMDs 322 corresponding to the tasks in the scheduler table 321. The QMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the QMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child task is added to a linked list in the scheduler table 321. A task is removed from a slot when the task is evicted.

Task Processing Overview

Figure 3B:
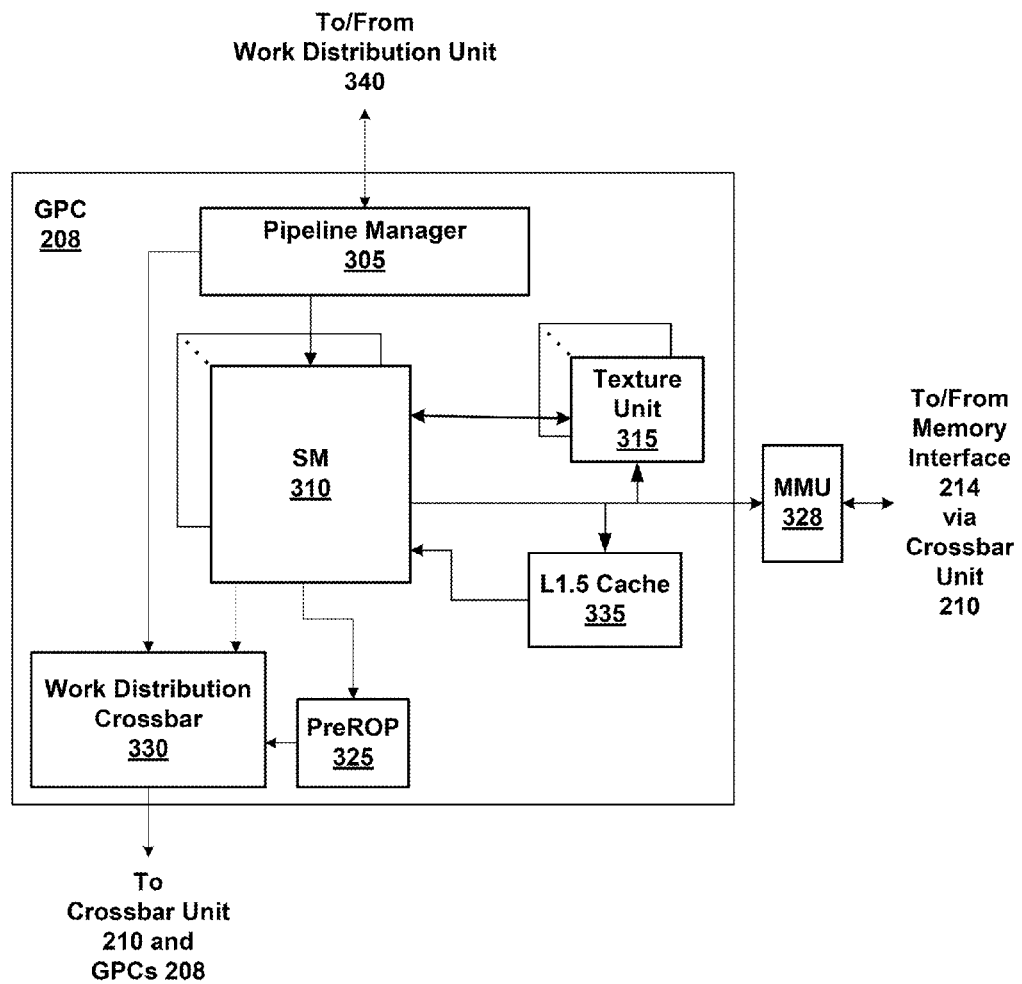
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (shown as Exec units 302 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Speculative Instruction Issue and Rollback

Figure 3C:
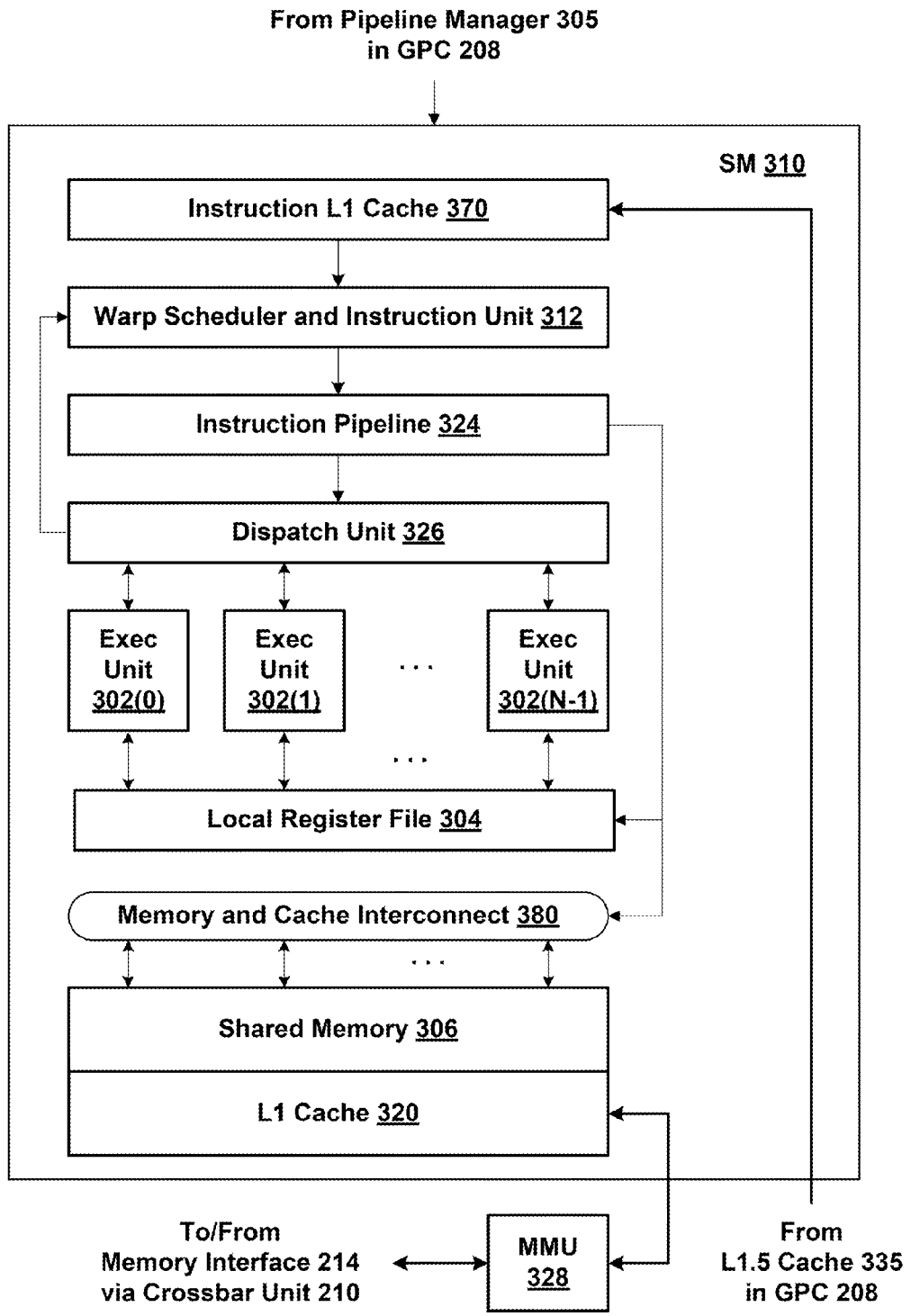
FIG. 3C is a block diagram of a portion of the streaming multiprocessor (SM) of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions from memory via L1.5 cache 335. A warp scheduler and instruction unit 312 receives instructions from the instruction L1 cache 370 and issues instructions to the instruction pipeline 324. The instruction issue process is speculative because the warp scheduler and instruction unit 312 is not configured to perform any decoding of the instructions. Therefore, the instructions are speculatively issued without determining anything about the instructions, e.g., the instruction type, number of source or destination operations, and the like.

The instruction pipeline 324 performs pre-execution instruction operations such as instruction decoding and data verification. The instruction pipeline 324 collects operands for the instructions, accessing local register file 304, memory and cache interconnect 380, shared memory 306, and L1 cache 320 according to the instructions to read and write operands. During the pre-execution instruction operations, the instruction pipeline 324 may determine that a rollback condition has occurred. The instruction pipeline 324 indicates if a rollback condition has occurred by setting a rollback flag and provides a rollback code identifying the cause of the rollback condition. The instruction pipeline 324 outputs the processed instructions, the rollback flag, and the rollback code to the dispatch unit 326.

The dispatch unit 326 maintains a resource scoreboard and state information for the threads and thread groups executing in the N exec (execution or processing) units 302. The dispatch unit 326 receives the processed instructions, rollback flag, and rollback code from the instruction pipeline 324 and when a rollback condition has not already been identified by the instruction pipeline 324, the dispatch unit 326 may determine that a rollback condition has occurred based on the resource scoreboard and state information. The rollback state includes the address of the instruction that caused the rollback. When a rollback condition occurs, the dispatch unit 326 outputs the rollback flag and the rollback code to the warp scheduler and instruction unit 312. Otherwise, the dispatch unit 326 dispatches the processed instructions for execution by the exec units 302. In one embodiment, when multiple rollback conditions occur, the rollback condition reported to the scheduler 312 indicates two or more rollback conditions have occurred. In another embodiment, the priority levels are specified for the different rollback conditions and the rollback condition having the highest priority is reported to the scheduler 312.

The rollback may be used to handle various error conditions while also enabling speculative issuing of instructions. When a rollback condition is identified, all in-flight instructions for the thread group that initiated the rollback should be invalidated. In-flight instructions include any instructions for the thread group that have issued but have not yet been dispatched (committed) for execution by the exec units 302. In a first phase of the rollback operation, issuing of instructions for the thread group stops and fetching of new instructions for the thread group also stops. As in-flight instructions for the thread group reach the dispatch unit 326, the in-flight instructions are discarded. In an alternate embodiment, the in-flight instructions are discarded by the warp scheduler and instruction unit 312, the instruction pipeline 324, and the dispatch unit 326 so that the in-flight instructions are not passed through to the dispatch unit 326. Once the rollback condition is removed or corrected, the second phase of the rollback operation begins with the warp scheduler and instruction unit 312 updating the program counter for the thread group. The warp scheduler and instruction unit 312 then fetches the rolled back instructions from the instruction L1 cache 370 starting at the program counter and issues the rolled back instructions.

SM 310 provides on-chip (internal) data storage with different levels of accessibility. Special registers (not shown) are readable but not writeable by the dispatch unit 326 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads in the same grid or queue that store a CTA identifier, the CTA dimensions, the dimensions of a grid to which the CTA belongs (or queue position if a queue), and an identifier of the grid or queue to which the CTA belongs. CTAs that belong to a grid have implicit x,y,z parameters indicating the position of the respective CTA within the grid. Special registers are written during initialization in response to commands received via front end 212 from device driver 103 and do not change during execution of a processing task. The front end 212 schedules each processing task for execution as either a grid or queue. Each CTA is associated with a specific grid or queue for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into N lanes, each having some number of entries (where each entry might store, e.g., a 32-bit word). One lane is assigned to each of the N exec units 302, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache may be included within the SM 310 to store uniform or constant values for each lane of the N exec units 302.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. The SM 310 may also include a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The instruction pipeline 324 is coupled to the shared memory 306 and the L1 cache 320 via a memory and cache interconnect 380. The instruction pipeline 324 is configured to detect a variety of rollback conditions including operands that are not available either due to a cache miss or because an operand has not yet been stored. For example, when an constant is not available in an constant cache, i.e., a cache miss occurs, the instruction pipeline 324 indicates that a rollback condition exists. A compiler typically organizes the instructions so that dependent instructions may be executed without delay by ensuring that any operands needed by the dependent instructions are computed (as needed) and stored by earlier instructions in the same or a different thread group. However, a rollback condition may cause instructions for one or more thread groups to be delayed. Consequently, the instruction pipeline 324 may be configured to determine that a rollback condition exists when a source or destination operand is not available in memory and is required for a dependent instruction.

The instruction pipeline 324 may also be configured to detect an invalid super-scalar-pair when an instruction specifies two operations that cannot be performed in parallel. When an invalid super-scalar-pair is detected, a rollback condition exists and the warp scheduler and instruction unit 312 will issue each operation as a separate instructions, i.e., the original instruction will be serialized. The instruction pipeline 324 may also be configured to detect when a source operand value is corrupted by using an error-correcting code (ECC). In one embodiment, the instruction pipeline 324 is configured to correct the source operand value using the ECC. In other embodiments, the instruction pipeline 324 indicates that a rollback condition exists by setting the rollback flag and rollback code accordingly.

The dispatch unit 326 is configured to detect a variety of rollback conditions including scoreboard interlocks for instructions due to resource contention and an instruction that is blocked by a synchronization barrier used to synchronize different thread groups. The synchronization barrier may not be able to be completed until instructions that have not yet issued are executed. Therefore, it is important to allow those unissued instructions to execute, if needed, bypassing the instruction that encountered the rollback condition.

When an entry is unavailable in the scoreboard or for storing the state information for a thread or thread group, the dispatch unit 326 may also determine that a rollback condition exists. Additionally, when the scoreboard indicates that memory or processing resource contention exists between an instruction that has not been dispatched and an instruction that is executing, the dispatch unit 326 indicates that a rollback condition exists by setting the rollback flag and rollback code accordingly. The compiler may be configured to organize the instructions for each thread group assuming predetermined latencies for some operations. When the predetermined latencies are exceeded due to a variety of circumstances, e.g., cache miss, rollback operations, the dispatch unit 326 determines that a rollback condition exists based on the scoreboard contents. Rather than stall the incoming processed instructions while waiting for the circumstance to resolve, the dispatch unit 326 determines that a rollback condition exists and the incoming processed instructions are handled without stalling.

Because the warp scheduler and instruction unit 312 does not decode instructions before issuing instructions to the instruction pipeline 324, the instructions are issued assuming that branches are not taken, i.e., instructions for the "fall-through" path through the program are speculatively issued. When the fall-through path is not taken, a rollback condition exists. However, whenever a fall-through path for a Branch or Jump instruction is valid, i.e., the thread group must execute the instructions in the fall-through path at some time, the rollback does not occur until after the instructions in the fall-through path are executed. In other words, the rollback is deferred and priority is given to the fall-through path. The dispatch unit 326 defers the rollback by pushing a divergence token onto the execution stack for any threads in the thread group that do not take the fall-through path and will execute the Branch or Jump instruction. The divergence token includes the program counter for the Branch or Jump instruction and an active mask indicating the threads in the thread group that will execute the Branch or Jump path.

The active mask for each thread group that is executing is maintained by the dispatch unit 326 and is output by the warp scheduler and instruction unit 312 with each issued instruction. The active mask is initialized when a thread group begins execution of a compute task and when a divergence token is popped. The dispatch unit 326 may be configured to resolve branch operations in addition to pushing and popping entries from the execution stack.

In one embodiment, execution of the fall-through paths are optimized to avoid a rollback to take the non-fall-through path for particular circumstances. For example, when the non-fall-through path instruction is a "popper" instruction that causes the threads executing the non-fall-through path to resume execution at the same instruction as the threads that took the fall-though path (following execution of the fall-through path), then no rollback occurs. A divergence token is not pushed onto the execution stack when the Branch or Jump instruction that triggered the rollback condition is detected. Examples of "popper" instructions include Exit, Return, Break, Continue, Longjump, and an instruction with a .S option indicating that the all of the active threads for the thread group need to synchronize before execution continues. In contrast, unconditional branch instructions including a call-relative (CAL), call absolute (JCAL), breakpoint (BPT) or interrupt, return-from-trap (RTT) or return from interrupt, branch-indirect (BRX), and jump-indirect (JMX) do cause a rollback condition that requires the rollback operation.

When the execution stack is configured to store some entries in a cache and other entries, further down in the stack, in graphics memory, the dispatch unit 326 may be configured to indicate that a rollback condition has occurred when the execution stack is not available. The execution stack may not be available when entries are being transferred from the cache to the graphics memory or from the graphics memory to the cache.

Figure 4A:
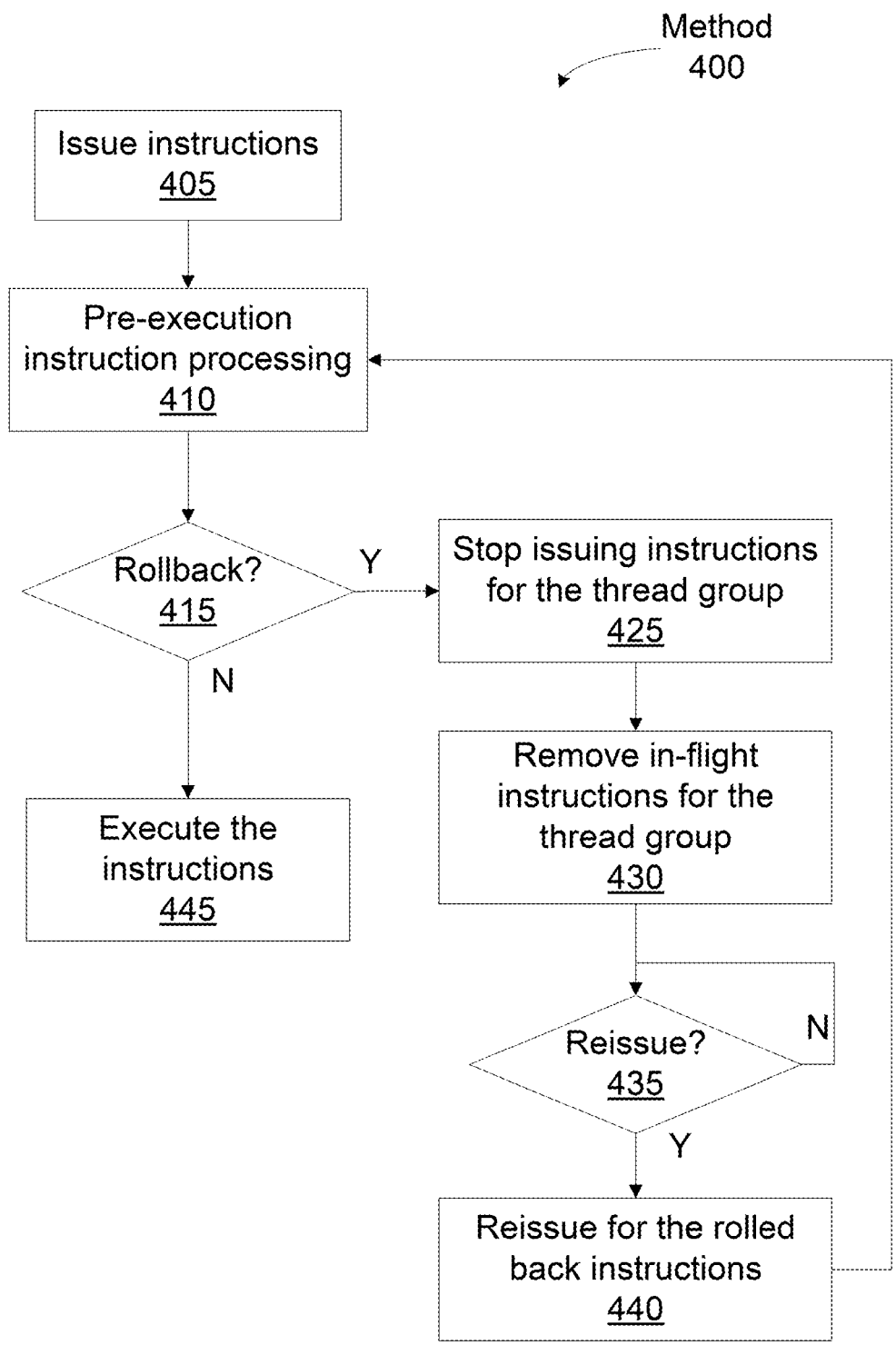
FIG. 4A illustrates a speculative instruction issue and instruction rollback method, according to one embodiment of the invention.

FIG. 4A illustrates a speculative instruction issue and instruction rollback method 400, according to one embodiment of the invention. Although the method steps are described in conjunction with the systems of FIGS. 1, 2, 3A, 3B, and 3C, persons skilled in the art will understand that any system configured to perform the method steps, in any order, is within the scope of the inventions.

At step 405 the warp scheduler and instruction unit 312 issues at least one instruction each clock cycle, interleaving instructions for one or more thread groups. At step 410 the instruction pipeline 324 and dispatch unit 326 perform pre-execution instruction processing on the instructions and identify any rollback conditions for the instructions. At step 415, just prior to committing a processed instruction for execution, the dispatch unit 326 examines the rollback flag for the processed instruction to determine if a rollback condition occurred for the processed instruction. If, a rollback condition did not occur, then at step 445 the dispatch unit 326 dispatches the processed instruction for execution by one or more exec units 302. Otherwise, at step 425 the dispatch unit 326 signals the warp scheduler and instruction unit 312 to stop issuing instructions for the thread group associated with the processed instruction associated with the set rollback flag. The dispatch unit 326 also provides the warp scheduler and instruction unit 312 with the rollback code that specifies the type of rollback condition.

At step 430, the dispatch unit 326 removes processed instructions for the thread group that were in-flight when the rollback condition was detected. The dispatch unit 326 also continues to dispatch processed instructions for other thread groups for which a rollback condition has not occurred so that execution of instructions for other thread groups continues while the rollback operation is completed. At step 435, the warp scheduler and instruction unit 312 determines if the rollback operation is complete and instructions that were rolled back may be reissued for the thread group. The rollback operation is complete when the rollback condition is removed or corrected. All of the in-flight instructions for the thread group for the rollback do not need to be removed for the instructions to be reissued. After the rollback operation is complete, the rolled back instructions are reissued for the thread group by the warp scheduler and instruction unit 312.

Some rollback conditions do not require a rollback operation for all of the threads in a thread group. Instead a partial rollback operation may be performed. Threads in a thread group that do not need to rollback are committed by the dispatch unit 326 and executed by the exec units 302 while a (partial) rollback operation is performed for other threads in the thread group. The dispatch unit 326 computes and stores a rollback active mask for the thread group indicating the threads for which the partial rollback operation will be performed. The rollback active mask is output by the warp scheduler and instruction unit 312 when the instructions are reissued for the thread group. While there is a partial rollback pending for a thread group, trap operations for the thread group are disallowed and the instructions and reissued instructions must complete execution before any trap is taken.

Instructions for which a partial rollback operation may be performed include a pixel attribute interpolation instruction and an indexed constant load instruction. When a portion of the threads in a thread group diverge for these instructions, a partial rollback is performed for the divergent threads.

When the instruction that caused the rollback is issued again only the divergent threads execute the instruction (according to the rollback active mask).

Figure 4B:
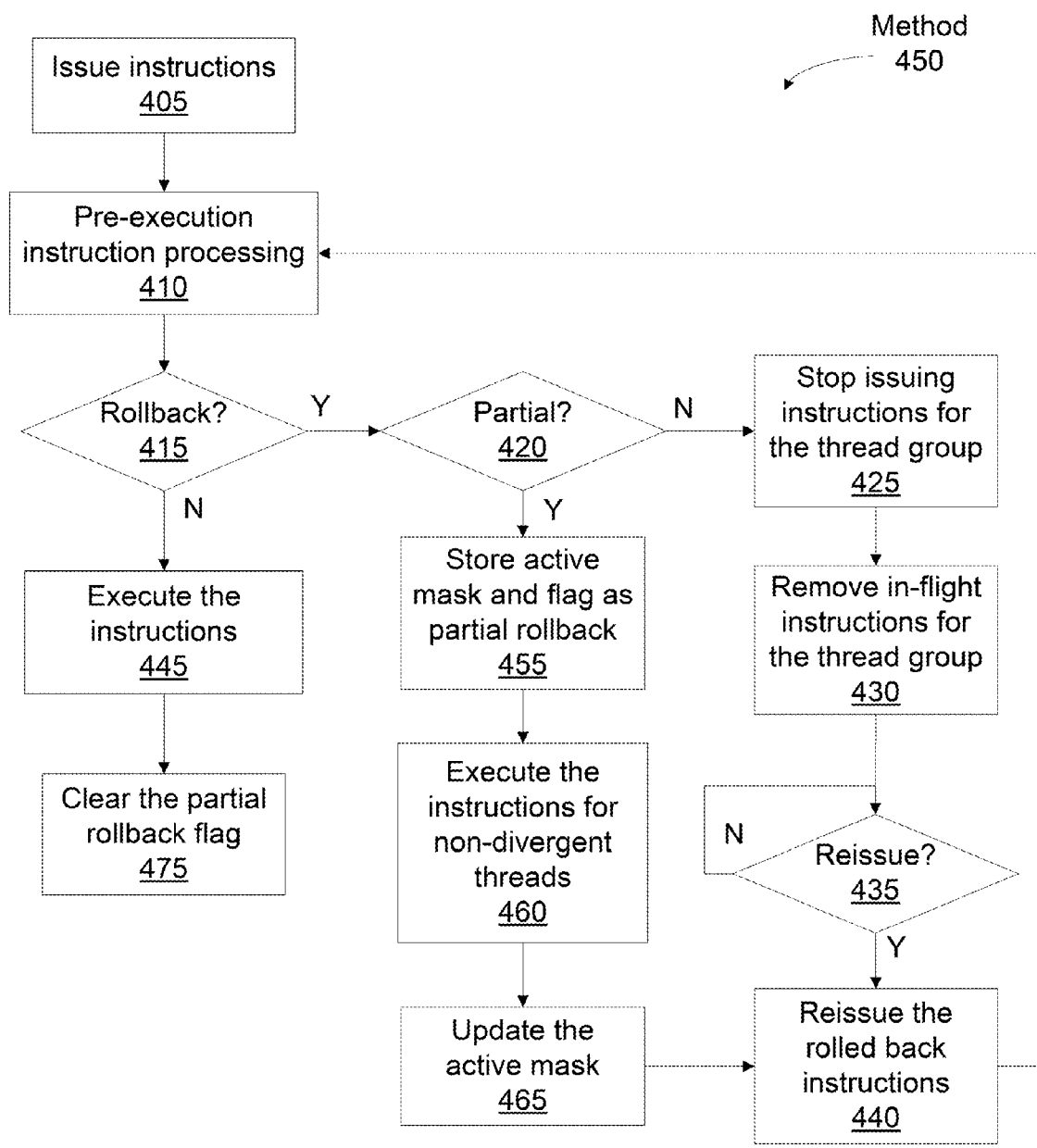
FIG. 4B illustrates a speculative instruction issue and partial instruction rollback method, according to one embodiment of the invention.

FIG. 4B illustrates a speculative instruction issue and partial instruction rollback method 450, according to one embodiment of the invention. Although the method steps are described in conjunction with the systems of FIGS. 1, 2, 3A, 3B, and 3C, persons skilled in the art will understand that any system configured to perform the method steps, in any order, is within the scope of the inventions.

At step 405 the warp scheduler and instruction unit 312 issues at least one instruction each clock cycle, interleaving instructions for one or more thread groups. At step 410 the instruction pipeline 324 and dispatch unit 326 perform pre-execution instruction processing on the instructions and identify any rollback conditions for the instructions. At step 415, just prior to committing a processed instruction for execution, the dispatch unit 326 examines the rollback flag for the processed instruction to determine if a rollback condition occurred for the processed instruction. If, a rollback condition did not occur, then at step 445 the dispatch unit 326 dispatches the processed instruction for execution by one or more exec units 302.

Otherwise, at step 420 the dispatch unit 326 determines if a partial rollback operation may be performed for the instruction, and, if not, then at step 425 the dispatch unit 326 signals the warp scheduler and instruction unit 312 to stop issuing instructions for the thread group associated with the processed instruction associated with the set rollback flag. The dispatch unit 326 also provides the warp scheduler and instruction unit 312 with the rollback code that specifies the type of rollback condition.

At step 430, the dispatch unit 326 removes processed instructions for the thread group that were in-flight when the rollback condition was detected. The dispatch unit 326 also continues to dispatch processed instructions for other thread groups for which a rollback condition has not occurred so that execution of instructions for other thread groups continues while the rollback operation is completed. At step 435, the warp scheduler and instruction unit 312 determines if the rollback operation is complete and instructions that were rolled back may be reissued for the thread group.

If at step 420 the dispatch unit 326 determines that a partial rollback operation may be performed for the instruction, then at step 455 the dispatch unit 326 computes and stores the partial rollback active mask and flags the thread group as performing a partial rollback operation. At step 460 the dispatch unit 326 dispatches the instruction and any in-flight instructions for execution by the non-divergent threads in the thread group. At step 465 the dispatch unit 326 updates the active mask for the thread group to the partial rollback active mask and proceeds to step 440 to reissue the rolled back instructions. After the rolled back instructions are executed at step 445, the dispatch unit 326 clears the partial rollback flag, thereby enabling execution of trap operations for the thread group.

Instructions for one or more thread groups are speculatively issued for pre-execution processing and any instructions that cannot be committed for execution are discarded and reissued for a thread group after a rollback condition which prevented execution is resolved. Discarding the instructions that cannot be committed due to a rollback condition allows other instructions, for other thread groups to be committed and executed instead of stalling while the rollback condition is resolved. Therefore, instruction processing throughput is maintained for thread groups that do not encounter a rollback condition.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of performing rollback of speculatively issued instructions, the method comprising:
    issuing a first set of instructions for at least a first portion of threads in a first thread group that comprises a plurality of threads concurrently executing within a processing core;
    issuing a second set of instructions for at least a second portion of threads in the first thread group or for a second thread group that also comprises a plurality of threads concurrently executing within the processing core;
    detecting, by a dispatcher, a first rollback condition for at least one thread included in the at least a first portion of the first thread group during pre-execution processing of an instruction in the first set of instructions;
    transmitting, by the dispatcher to a scheduler, a rollback code identifying a cause of the first rollback condition;
    in response to receiving the rollback code, stopping, by the scheduler, issuing of additional instructions for the at least a first portion of threads in the first thread group;
    discarding in-flight instructions that have issued and have not yet begun executing as part of the first set of instructions; and
    while discarding the in-flight instructions, executing the second set of instructions.

2. The method of claim 1, further comprising:
    issuing a third set of instructions for a third thread group that also comprises a plurality of threads concurrently executing within the processing core;
    detecting a partial rollback condition for at least one thread in the third thread group during pre-execution processing of a first instruction in the third set of instructions;
    storing a partial rollback active mask indicating a first portion of threads in the third thread group that diverge for the first instruction; and
    executing the first instruction for a second portion of the threads in the third thread group that do not diverge for the first instruction.

3. The method of claim 2, further comprising,
    reissuing the first instruction for the third thread group; and executing the first instruction for the first portion of threads in the third thread group based on the partial rollback active mask.

4. The method of claim 1, wherein the instruction in the first set of instructions specifies an invalid super-scalar-pair of two operations that cannot be performed in parallel.

5. The method of claim 4, further comprising:
issuing a first operation of the invalid super-scalar-pair as a first instruction for the at least a first portion of threads in the first thread group; and
issuing a second operation of the invalid super-scalar-pair as a second instruction for the at least a first portion of threads in the first thread group.

6. The method of claim 1, wherein the instruction in the first set of instructions is a barrier synchronization instruction configured to synchronize the at least a first portion of threads in the first thread group with the at least a second portion of threads in the first thread group or the second thread group.

7. The method of claim 1, wherein the instruction in the first set of instructions specifies an operand that is corrupted.

8. The method of claim 1, further comprising:
determining that the rollback condition is removed; and
reissuing the first set of instructions for the at least a first portion of threads in the first thread group.

9. The method of claim 1, wherein the in-flight instructions are discarded after completing the pre-execution processing.

10. The method of claim 1, further comprising:
determining that the rollback condition is removed; and
reissuing the first set of instructions for the at least a first portion of threads in the first thread group before all of the in-flight instructions are discarded.

11. A system for scheduling compute tasks for execution, the system comprising:
a memory that stores a first set of instructions for at least a first portion of threads in a first thread group and a second set of instructions for at least a second portion of threads in the first thread group or for a second thread group;
a scheduler that:
issues the first set of instructions for the at least a first portion of threads in the first thread group that comprises a plurality of threads concurrently executing within a processing core;
issues the second set of instructions for the at least a second portion of threads in the first thread group or for the second thread group that also comprises a plurality of threads concurrently executing within the processing core; and
in response to receiving a rollback code from a dispatcher, stops issuing additional instructions for the at least a first portion of threads in the first thread group when a first rollback condition is detected;
the dispatcher that:
detects the first rollback condition for at least one thread included in the at least a first portion of threads in the first thread group during pre-execution processing of an instruction in the first set of instructions; and
transmits, to the scheduler, the rollback code identifying a cause of the first rollback condition;
discards in-flight instructions that have issued and have not yet begun executing as part of the first set of instructions; and
multiple execution units within the processing core that, while discarding the in-flight instructions, execute the second set of instructions.

12. The system of claim 11, wherein the scheduler further:
issues a third set of instructions for a third thread group, the dispatcher further:
detects a partial rollback condition for at least one thread in the third thread group during pre-execution processing of a first instruction in the third set of instructions; and
stores a partial rollback active mask indicating a first portion of threads in the third thread group that diverge for the first instruction, and
the multiple execution units:
execute the first instruction for a second portion of the threads in the third thread group that do not diverge for the first instruction.

13. The system of claim 12, wherein the scheduler reissues the first instruction for the third thread group and the multiple execution units execute the first instruction for the first portion of threads in the third thread group based on the partial rollback active mask.

14. The system of claim 11, wherein the instruction in the first set of instructions specifies an invalid super-scalar-pair of two operations that cannot be performed in parallel.

15. The system of claim 14, wherein the scheduler:
issues a first operation of the invalid super-scalar-pair as a first instruction for the at least a first portion of threads in the first thread group; and
issues a second operation of the invalid super-scalar-pair as a second instruction for the at least a first portion of threads in the first thread group.

16. The system of claim 11, wherein the instruction in the first set of instructions is a barrier synchronization instruction configured to synchronize the at least a first portion of threads in the first thread group with the at least a second portion of threads in the first thread group or the second thread group.

17. The system of claim 11, wherein the instruction in the first set of instructions specifies an operand that is corrupted.

18. The system of claim 11, wherein the scheduler reissues the first set of instructions for the at least a first portion of threads in the first thread group after the rollback condition is removed.

19. The system of claim 11, wherein the dispatcher discards the in-flight instructions after completing the pre-execution processing of the in-flight instructions.

20. A non-transitory computer-readable storage medium storing instructions that, when executed by a processor, cause the processor to perform rollback of speculatively issued instructions, by performing the steps of:
issuing a first set of instructions for at least a first portion of threads in a first thread group that comprises a plurality of threads concurrently executing within a processing core;
issuing a second set of instructions for at least a second portion of threads in the first thread group or for a second thread group that also comprises a plurality of threads concurrently executing within the processing core;
detecting, by a dispatcher, a first rollback condition for at least one thread included in the at least a first portion of threads in the first thread group during pre-execution processing of an instruction in the first set of instructions;

transmitting, by the dispatcher to a scheduler, a rollback code identifying a cause of the first rollback condition;

in response to receiving the rollback code, stopping, by the scheduler, issuing of additional instructions in the first set of instructions for the at least a first portion of threads in the first thread group;

discarding in-flight instructions that have issued and have not yet begun executing as part of the first set of instructions; and while discarding the in-flight instructions, executing the second set of instructions.

21. The method of claim 1, wherein executing the second set of instructions comprises executing the second set of instructions while issuing additional instructions for the at least a first portion of threads in the first thread group are stopped.

22. The method of claim 1, wherein the rollback condition indicates that two or more rollback conditions have occurred.

23. The method of claim 1, wherein the rollback condition is detected based on having a priority level that is higher than a priority level associated with another co-occurring rollback condition.

24. The method of claim 1, wherein the in-flight instructions comprise instructions in the at least a first portion of threads in the first thread group that have issued but have not yet been dispatched for execution.

25. The method of claim 1, wherein the rollback condition comprises a scoreboard interlock.

26. The method of claim 1, wherein the rollback condition occurs when a scoreboard entry is unavailable.

27. The method of claim 1, wherein the rollback condition occurs when a scoreboard indicates resource contention between an instruction that has not been dispatched and an instruction that is executing.

28. The system of claim 11, wherein the scheduler further processes the first set of instructions according to the rollback code.

* * * * *